April 1, 1947.    M. H. WHITE ET AL    2,418,440
PRESSURE OPERATED DRAIN VALVE
Filed Jan. 5, 1945

Inventor
MARTIN H. WHITE AND
HERBERT R. JOHNSON
By Shoemaker & Maltare
Attorney

Patented Apr. 1, 1947

2,418,440

UNITED STATES PATENT OFFICE 2,418,440

PRESSURE OPERATED DRAIN VALVE

Martin H. White, Raleigh, and Herbert R. Johnson, Durham, N. C.

Application January 5, 1945, Serial No. 571,708

10 Claims. (Cl. 303—88)

The invention relates to a fluid pressure operated drain valve.

An object of the present invention is to provide a simple, practical, and efficient fluid pressure operated drain valve of strong, durable, and sturdy construction adapted to drain water and oil or other liquid from air storage tanks of air brake systems of buses, trucks, and other vehicles and from fluid pressure storage tanks of other apparatus or equipment and provided with a normally closed inlet valve and a normally open discharge valve operated by fluid pressure to close the discharge valve and open the inlet valve when an air brake is applied and to close the inlet valve and open the discharge valve when the brake pressure is released, whereby any liquid accumulating in the air storage tank will be permitted to drain into the drain valve during the application of the air brake and is allowed to drain from the drain valve at all times when the air brake is not in operation, so that any water drained from the air tank into the drain valve will not remain in the drain valve any material length of time or long enough to freeze and interfere with the operation of the drain valve.

A further object of the invention is to provide a fluid pressure operated drain valve of this character in which the discharge valve will close prior to the opening of the inlet valve and the inlet valve will close prior to the opening of the discharge valve so that there will be no loss of air brake pressure during the interval of the opening and closing of the inlet and discharge valves.

Another object of the invention is to provide a fluid pressure operated safety drain valve which will permit ready access to its interior without releasing pressure within the air tank and should any of the valve operating means become impaired or inoperative, the inlet valve will remain in its normally closed position so that there will be no loss of air pressure.

With these and other objects in view, the invention consists in the novel construction, arrangement, and combination of parts hereinafter fully described, illustrated in the accompanying drawings, and pointed out in the claims hereto appended, it being understood that various changes in the form, proportion, and minor details of construction may be resorted to without departing from the spirit or sacrificing any of the advantages of the invention.

Figure 1:
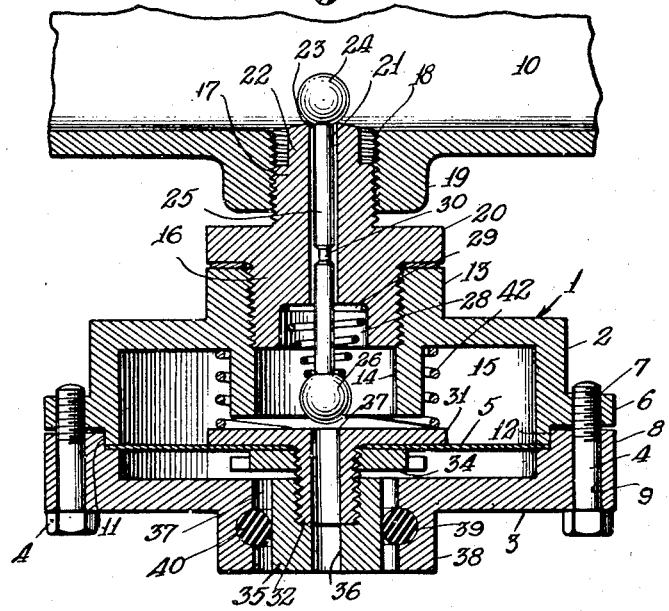
Fig. 1 is a vertical sectional view of a fluid pressure operated drain valve constructed in accordance with this invention, the parts being in their normal position with the inlet valve closed and the discharge valve open.
Figure 3:
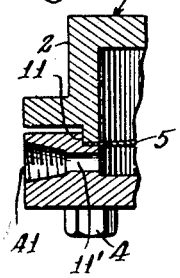
Fig. 3 is a detail vertical sectional view of a portion of the casing showing the passage for admitting fluid pressure beneath the diaphragm.

In the accompanying drawings, in which is illustrated a preferred form of the invention, the fluid operated safety drain valve comprises in its construction an outer casing 1 composed of upper and lower sections 2 and 3 secured together by a plurality of bolts 4 which also operate to clamp the periphery of a spring loaded diaphragm 5 between the sections 2 and 3 of the casing.

The casing, which may be constructed of any suitable material, is preferably of cylindrical form and the upper section is provided at its lower portion with a horizontally extending annular flange 6 having threaded openings 7 to receive the threaded portions of the bolts 4. The lower section 3 of the casing is provided at its periphery with an annular flange or boss 8 having openings 9 through which pass the bolts 4.

The bolts 4 extend upwardly through the attached portions of the casing from the bottom and are readily accessible should it become necessary to obtain access to the interior of the drain valve after the same has been applied to an air tank 10.

The annular boss 8 is provided at its inner face with an annular recess 11 forming a seat for the periphery of the diaphragm which is engaged at its upper face by a depending annular flange 12 of the upper section of the casing. The diaphragm is constructed of stainless steel or any other suitable material and in the operation of the drain valve is positively actuated by the air brake pressure applied as hereinafter fully explained to either its upper or lower faces.

The upper section of the casing is provided with an interiorly threaded upwardly extending tubular portion or neck 13 and a depending tubular portion 14 which extends downwardly into the chamber 15 formed by the casing. The upwardly extending tubular portion 13 is interiorly threaded to receive a plug 16 provided with a central flange and having an upwardly extending nipple 17 which has a threaded engagement with an interiorly threaded flanged opening 18 in the bottom or lowermost portion of the air tank 19.

The bottom of the air tank is provided at the opening 18 with an annular boss or enlargement 19 and the plug has a wrench receiving flange or portion 20 extending horizontally from the plug in the lower end of the nipple 17. The plug 16 which is threaded into the upwardly extending flange or neck 13 and into the threaded opening 18 forms a coupling for connecting the casing with the tank.

Figure 2:
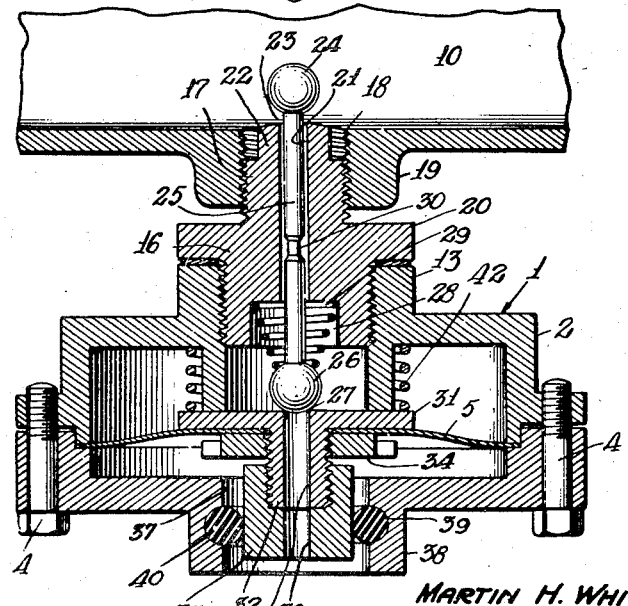
Fig. 2 is a similar view illustrating the position of the parts when the discharge valve is closed and the inlet valve is open before equilibrium of pressures is reached.

The plug is provided with a vertical bore or opening 21 and its upper portion 22 is reduced diametrically and extends slightly above the surface of the bottom of the tank to provide a seat 23 for a valve member 24 of a valve element consisting of a valve stem 25 and ball shaped heads 24 and 26. The valve seat 23 at the upper end of the nipple 17 and the valve member 24 constitutes an inlet valve and the lower valve member 26 cooperates with a valve seat 27 carried by the diaphragm and forming with the valve member 26 a discharge valve. As illustrated in Fig. 1 of the drawings, the discharge valve is open when the inlet valve is closed, which is the normal position of the same, and when the discharge valve is closed, as illustrated in Fig. 2, the inlet valve is open to permit water and oil to drain from the air tank into the casing of the drain valve.

The lower end of the valve plug is provided with a central recess 28 which receives an inverted helical or conical coil spring 29 seated at its upper end against the end wall of the recess 28 and at its lower end upon the valve member 26 to assist the gravity action of the inlet valve in closing and to effect a positive closing of the same when the diaphragm, after an application of an air brake, is permitted to return to its initial or normal position. The valve actuating coil spring 29 also prevents any jar or vibration from opening the inlet valve when the discharge valve is open and the parts arranged as illustrated in Fig. 1.

The valve stem is preferably constructed of iron or steel hardened to render it brittle and it is provided at a point intermediate of its ends with an annular groove 30 forming a weakened frangible portion adapted to be broken should the valve stem be subjected to any force tending to bend it. If the fluid pressure operated drain valve should be broken off from the tank, it will result in the breaking of the valve stem and the inlet valve will be left in its closed position and there will be no danger of loss of the air pressure within the air tank, which has happened when drain valves heretofore constructed have been broken off from the air tanks to which they were connected. No claim is made in the present application to the safety feature of the drain valve as this forms the subject matter of a separate co-pending application which is a division or continuation-in-part of the present application.

The valve seat 27 is formed by a disk 31 formed integral with an exteriorly threaded tubular member 32 provided with a central bore or opening 33 leading from the valve seat 27 and forming a passage for permitting water and oil to drain from the drain valve. The disk 31 engages the upper face of the diaphragm 5 which is engaged at its lower face by a nut 34, whereby the tubular member 32 is securely clamped to the diaphragm and moves upwardly and downwardly with the same. The diaphragm divides the chamber 15 into an upper fluid pressure receiving portion and a lower fluid pressure receiving portion.

The tubular member 32 has mounted on it a cylindrical sleeve 35 having a central bore or opening 36 forming a continuation of the bore or opening 33 of the tubular member 32 and countersunk and threaded at its upper portion to receive and engage the tubular member which is exteriorly threaded for engagement with the nut 34 and the sleeve 35.

The bottom 3 of the casing is provided with a central opening 37 and it has a depending flange 38 surrounding the opening and forming a continuation of the same and provided at its inner face with an annular groove 39 in which is arranged a circular packing ring or grommet 40 of rubber or other suitable material and slidably receiving the sleeve 35. The annular groove 39 is segmental in cross section and the packing ring which is circular in cross section conforms to and fits snugly within the annular groove 39 and has a frictional engagement with the smooth cylindrical exterior of the sleeve 35 which constitutes a guiding element for the diaphragm in its upward and downward movements.

Compressed air from an air brake is admitted into the interior of the casing below the diaphragm by means of a lateral passage 41 when the brakes are applied and when the packing ring is subjected to air pressure from above, it will tend to compress the packing ring vertically and expand it horizontally so that the greater the pressure to which the packing ring is subjected, the tighter will be its engagement with the sleeve, so that the air brake pressure will be confined within the casing when admitted through the passage 41 to the space beneath the diaphragm.

The lateral passage 41 may be connected with any portion of the air brake system which is subjected to air pressure when the brake is applied and while the passage leading to the space beneath the diaphragm is shown extending through one side of the casing, it may of course be arranged at any other convenient location.

The depending tubular portion 14 constitutes a stop for limiting the upward movement of the diaphragm and it has disposed on it a cylindrical coil spring 42 seated at its upper end against the lower face of the top wall of the casing and at its lower end upon the disk 31 and arranged to urge the diaphragm downwardly when the air brake pressure is released.

When a bus or other vehicle having the fluid operated drain valve is running and there is no pressure on the diaphragm, the inlet valve is closed and the valve member at the lower end of the valve stem is spaced slightly from the diaphragm and the discharge valve is opened to permit drainage through the discharge outlet formed by the bore of the tubular member 32 and the sleeve 35 and there is no liability of water or oil collecting in the drain valve and freezing.

When there is an application of the air brake, pressure is applied to the lower face of the diaphragm which is raised and which carries the valve seat 27 into engagement with the lower valve member 26, thereby closing the discharge valve. This occurs prior to the opening of the inlet valve. The continued upward movement of the diaphragm operates to lift the valve member 24 from its seat 23 and open the inlet valve which permits water and oil to drain through the passage 21 into the casing. Prior to the opening of the inlet valve, both the inlet and discharge valves are closed so that there is no liability of the inlet and outlet valves being opened simultaneously and a loss of air brake pressure from the tank. Both valves cannot possibly be opened at the same time.

The inlet valve remains open until the force exerted by the fluid under pressure in the upper fluid receiving portion of chamber 15 plus the forces exerted by the valve actuating coil spring 28 and the cylindrical spring 42 equals the force exerted by the fluid under pressure in the lower fluid receiving portion of chamber 15. As this condition of equilibrium of forces is approached, the diaphragm moves downwardly until equilibrium of forces is reached at which time the inlet valve member 24 engages the seat 23 and both inlet and outlet valves are closed. This static condition is maintained until the air brake pressure is released for if any oil or water or other accumulation drains past the outlet valve because of a leak or for other reasons then the fluid pressure in the upper fluid pressure receiving portion of chamber 15 would decrease and the force exerted under the diaphragm would be sufficiently greater to raise the diaphragm, further seating the outlet valve and slightly opening the inlet valve permitting the pressure in the upper fluid pressure receiving portion of chamber 15 to increase to the point of equilibrium of forces at which time both valves would again be closed. Conversely, if through any leak or other reason, the pressure in the upper fluid receiving chamber should continue to increase beyond the point of equilibrium of forces, the sum of forces in the upper portion exerted on the top face of the diaphragm will be greater than the total force in the lower portion exerted on the bottom face of the diaphragm, and the diaphragm will move downwardly further seating the inlet valve and slightly opening the outlet valve permitting sufficient drainage from the upper chamber to obtain pressure decrease to the point of equilibrium of forces, at which time both valves would again be closed.

When air brake pressure is released after an application of the air brake, the pressure in chamber 15 below the diaphragm discharges to the atmosphere and the force exerted by the fluid under pressure in the chamber 15 above the diaphragm plus the force exerted by the valve actuating coil spring 28 and the cylindrical spring 42 will move the diaphragm downwardly further seating the inlet valve and then opening the outlet valve permitting the oil and water and other accumulations to drain from the upper chamber. When the valve member reaches its stationary point and when the pressure in the upper chamber is dissipated by reason of drainage the cylindrical coil spring will move the diaphragm downwardly to its fullest extent and will permit complete drainage from the upper chamber at all times except when there is an application of the air brakes.

Should the drain valve for any reason become inoperative in its functions of opening the inlet valve and closing the discharge valve, the inlet valve will remain closed and there will be no loss of air pressure from the air tank.

In the operation of the drain valve, the only air permitted to escape into the atmosphere is air which may be trapped in the chamber and at no time is air permitted to escape directly from the air tank into the atmosphere, due to the impossibility of both valves being open at the same time and to the discharge valve closing prior to the opening of the inlet valve and remaining closed until the inlet valve is closed.

The valve assembly, which is compact, is adapted to be readily applied to and removed from an air tank of an air brake system or other apparatus and access to the interior of the casing may be readily had without removing the entire assembly from the air tank to permit the replacement of springs or for other repairs and replacements. While this description refers to air tanks and air brake systems for purposes of lucidity, this device is adaptable to use in any fluid pressure system requiring drainage in which there are intermittent cycles of pressure and discharge, however actuated.

What is claimed is:

1. A fluid pressure operated drain valve adapted to be connected to a fluid pressure tank and including a casing forming a chamber and having an inlet passage provided with a valve seat, a diaphragm dividing the chamber into an upper fluid pressure receiving portion and a lower fluid pressure receiving portion and having an outlet passage discharging through the bottom of the casing and provided with a valve seat, and a valve element comprising a stem operating in the inlet passage and provided at its upper end with a valve member cooperating with and normally engaging the seat of the inlet passage and forming therewith an inlet valve, said stem being provided at its lower end with a valve member normally spaced from the valve seat of the outlet passage and forming therewith a discharge valve, said diaphragm when subjected to fluid pressure in the lower portion of said chamber operating to close the discharge valve, the inlet and discharge valves being responsive to varying pressures on the diaphragm operating either to close both valves or to open one valve and close the other valve.

2. A fluid pressure operated drain valve adapted to be connected to a fluid pressure tank and including a casing forming a chamber and having an inlet passage provided with a valve seat, a diaphragm dividing the chamber into an upper fluid pressure receiving portion and a lower fluid pressure receiving portion and having an outlet passage discharging through the bottom of the casing and provided with a valve seat, and a valve element comprising a stem operating in the inlet passage and provided at its upper end with a valve member cooperating with and normally engaging the seat of the inlet passage and forming therewith an inlet valve, said stem being provided at its lower end with a valve member normally spaced from the valve seat of the outlet passage and forming therewith a discharge valve, said diaphragm when subjected to fluid pressure in the lower portion of said chamber operating to close the discharge valve, the inlet and discharge valves being responsive to varying pressures on the diaphragm operating either to close both valves or to open one valve and close the other, and the spacing of the valve seat of the outlet passage being such that the upward movement of the diaphragm will positively close the discharge valve prior to the opening of the inlet valve and will positively effect a closing of the inlet valve prior to the opening of the discharge valve when fluid pressure in the lower portion of said chamber is released and the diaphragm permitted to move downwardly.

3. A fluid pressure operated drain valve adapted to be connected to a fluid pressure tank and including a casing forming a chamber and having an inlet passage provided with a valve seat, a diaphragm dividing the chamber into an upper fluid pressure receiving portion and a lower fluid pressure receiving portion and having an outlet passage discharging through the bottom of the casing and provided with a valve seat, and a valve element comprising a stem operating in the inlet passage and provided at its upper end with a valve member cooperating with and normally engaging the seat of the inlet passage and forming therewith an inlet valve, said stem being provided at its lower end with a valve member normally spaced from the valve seat of the outlet passage and normally spaced therefrom and forming therewith a discharge valve, said diaphragm when subjected to fluid pressure in the lower portion of said chamber operating to close the discharge valve, the inlet and discharge valves being responsive to varying pressures on the diaphragm operating either to close both valves or to open one valve and close the other, and a valve actuating spring engaging the valve element for urging the same downwardly.

4. A fluid pressure operated drain valve adapted to be connected to a fluid pressure tank and including a casing forming a chamber and having an inlet passage provided with a valve seat, a diaphragm dividing the chamber into an upper fluid pressure receiving portion and a lower fluid pressure receiving portion and having an outlet passage discharging through the bottom of the casing and provided with a valve seat, and a valve element comprising a stem operating in the inlet passage and provided at its upper end with a valve member cooperating with and normally engaging the seat of the inlet passage and forming therewith an inlet valve, said stem being provided at its lower end with a valve member normally spaced from the valve seat of the outlet passage and normally spaced therefrom and forming therewith a discharge valve, said diaphragm when subjected to fluid pressure in the lower portion of said chamber operating to close the discharge valve, the inlet and discharge valves being responsive to varying pressures on the diaphragm operating either to close both valves or to open one valve and close the other, and a diaphragm actuating spring interposed between the upper portion of the casing and the diaphragm for urging the latter downwardly.

5. A fluid pressure operated drain valve adapted to be connected to a fluid pressure tank and including a casing forming a chamber and provided at the top with a threaded opening, a plug having a lower threaded portion to engage the threaded opening of the casing and provided with an upper threaded nipple for engaging a threaded opening of an air tank, said plug being provided with an inlet passage and having a valve seat at the upper end thereof, a diaphragm dividing the chamber of the casing into upper and lower fluid pressure receiving portions and having an outlet passage discharging through the bottom of the casing and provided at the upper end with a valve seat, and a valve stem operating in the inlet passage of the plug and provided at its upper end with a valve member normally engaging the valve seat of the plug, said stem being also provided at its lower end with a valve member normally spaced from the valve seat of the diaphragm.

6. A fluid pressure operated drain valve adapted to be connected to a fluid pressure tank and including a casing having a chamber and provided at the top with an opening, a plug secured in the opening and having an upper nipple portion for attachment to an air tank, said plug being provided with an inlet passage and having its upper portion reduced and forming a valve seat and provided in its lower end with a recess, a diaphragm dividing the chamber of the casing into upper and lower fluid pressure receiving portions and having an outlet passage discharging through the bottom of the casing and provided with a valve seat, a valve stem operating in the inlet passage and provided at its ends with upper and lower valve members, the upper valve member normally engaging the valve seat of the plug and the lower valve member being normally spaced from the valve seat of the diaphragm, and a spring interposed between the plug and the lower valve member and having its upper portion seated in the recess of the plug.

7. A fluid pressure operated drain valve adapted to be connected to a fluid pressure tank and including a casing having a chamber and provided at its upper portion with an inlet passage having a valve seat, a diaphragm dividing the chamber into upper and lower fluid pressure receiving portions and having a central opening, a tubular member extending through the central opening of the diaphragm and having at its upper end a portion engaging said diaphragm, a nut arranged on the threaded portion and engaging the lower face of the diaphragm, said tubular member being provided with an outlet passage discharging through the bottom of the casing and having a valve seat and a valve stem operating in the inlet passage of the casing and provided at its upper and lower ends with valve members cooperating with said valve seats to form inlet and discharge valves, the inlet valve being normally closed and the discharge valve normally open.

8. A fluid pressure operated drain valve adapted to be connected to a fluid pressure tank and including a casing having a chamber and provided at its upper portion with an inlet passage having a valve seat, a diaphragm dividing the chamber into upper and lower fluid pressure receiving portions and having a central opening, a tubular member extending through the central opening of the diaphragm and having at its upper end a portion engaging said diaphragm, a nut arranged on the threaded portion and engaging the lower face of the diaphragm, said tubular member being provided with an outlet passage discharging through the bottom of the casing and having a valve seat and a valve stem operating in the inlet passage of the casing and provided at its upper and lower ends with valve members cooperating with said valve seats to form inlet and discharge valves, the inlet valve being normally closed and the discharge valve normally open, a tubular portion depending into said chamber from the top of the casing and arranged to limit the upward movement of the diaphragm, and a diaphragm actuating spring disposed on said tubular portion and interposed between the casing and the diaphragm for urging the diaphragm downwardly.

9. A fluid pressure operated drain valve adapted to be connected to a fluid pressure tank and including a casing forming a chamber and having an inlet passage at the upper portion provided with a valve seat, said casing being provided in its lower portion with a bottom opening, a diaphragm dividing the casing into upper and lower fluid pressure receiving portions, a tubular member carried by the diaphragm and having an outlet passage, a sleeve secured to the tubular member and having a passage forming a continuation of the outlet passage of the tubular member, a packing ring seated in the wall of the bottom opening of the casing and surrounding and engaging said sleeve, and a valve stem operating in the inlet passage of the casing and provided at its upper and lower ends with valve members cooperating with said valve seats to form inlet and discharge valves.

10. A fluid pressure operated drain valve adapted to be connected to a fluid pressure tank and including a casing forming a chamber and having an inlet passage provided with a valve seat, a diaphragm dividing the chamber into an upper fluid pressure receiving portion and a lower fluid pressure receiving portion and having an outlet passage discharging through the bottom of the casing and provided with a valve seat, a valve element provided with an upper valve member cooperating with and normally engaging the seat of the inlet passage and forming therewith an inlet valve, said valve element being provided with a lower valve member normally spaced from the valve seat of the outlet passage and forming therewith a discharge valve, said diaphragm when subjected to fluid pressure in the lower portion of said chamber operating to close the discharge valve, the inlet and discharge valves being responsive to varying pressures on the diaphragm operating either to close both valves or to open one valve and close the other.

MARTIN H. WHITE.
HERBERT R. JOHNSON.

REFERENCES CITED

The following references are of record in the file of this patent:

UNITED STATES PATENTS

| Number | Name | Date |
|---|---|---|
| 2,215,144 | Aikman | July 26, 1938 |
| 2,316,052 | Dach | Apr. 6, 1943 |